(12) United States Patent
Hubbard

(10) Patent No.: US 11,500,187 B2
(45) Date of Patent: Nov. 15, 2022

(54) SYSTEMS, METHODS, AND STRUCTURES FOR BROADBAND PHASE SHIFTING FOR QUANTITATIVE PHASE MICROSCOPY

(71) Applicant: MASSACHUSETTS INSTITUTE OF TECHNOLOGY, Cambridge, MA (US)

(72) Inventor: William Hubbard, Chester, NH (US)

(73) Assignee: Massachussets Institute of Technology, Cambridge, MA (US)

(*) Notice: Subject to any disclaimer, the term of this patent is extended or adjusted under 35 U.S.C. 154(b) by 236 days.

(21) Appl. No.: 16/901,511

(22) Filed: Jun. 15, 2020

(65) Prior Publication Data

US 2020/0393664 A1 Dec. 17, 2020
US 2021/0405338 A9 Dec. 30, 2021

Related U.S. Application Data

(60) Provisional application No. 62/933,665, filed on Nov. 11, 2019, provisional application No. 62/861,514, filed on Jun. 14, 2019.

(51) Int. Cl.
| | | |
|---|---|---|
| *G02B 21/00* | (2006.01) | |
| *G02B 26/02* | (2006.01) | |
| *G02B 21/14* | (2006.01) | |
| *G02B 26/06* | (2006.01) | |

(52) U.S. Cl.
CPC ......... *G02B 21/14* (2013.01); *G02B 21/0032* (2013.01); *G02B 26/06* (2013.01)

(58) Field of Classification Search
CPC ............... G02B 21/00; G02B 21/0004; G02B 21/0016; G02B 21/0032; G02B 21/0052; G02B 21/0056; G02B 21/008; G02B 21/02; G02B 21/06; G02B 21/10; G02B 21/14; G02B 21/361; G02B 27/00; G02B 27/02; G02B 27/023; G02B 27/04; G02B 27/06; G02B 27/08; G02B 27/0808
USPC ................. 359/368–390, 227–236, 738–740
See application file for complete search history.

(56) References Cited

U.S. PATENT DOCUMENTS

| | | | | |
|---|---|---|---|---|
| 3,658,405 | A * | 4/1972 | Pluta ...................... | G02B 21/14 |
| | | | | 359/489.08 |
| 6,985,232 | B2 * | 1/2006 | Sezginer ............ | G01B 9/02088 |
| | | | | 356/497 |
| 2009/0207414 | A1 | 8/2009 | Ozcan et al. | |
| 2010/0149073 | A1 | 6/2010 | Chaum et al. | |
| 2013/0286400 | A1 | 10/2013 | Kim et al. | |
| 2015/0055745 | A1 | 2/2015 | Holzner et al. | |

OTHER PUBLICATIONS

Written Opinion and International Search Report of the International Searching Authority, dated Aug. 24, 2020.

* cited by examiner

*Primary Examiner* — Thong Q Nguyen
(74) *Attorney, Agent, or Firm* — Nields, Lemack & Frame, LLC

(57) ABSTRACT

Disclosed are systems, methods, and structures for broadband phase shifting for quantitative phase microscopy (QPI) that advantageously allows for a greater useable wavelength range for QPI wherein either/both illumination paths and/or scatter paths: 1) propagate through a reflective objective; 2) become quantifiably phase-shifted utilizing broadband mirror surfaces; 3) attenuate the relatively bright illumination paths to maximize contrast; and 4) recombine at a sensor plane for quantitative analysis.

12 Claims, 8 Drawing Sheets

SYSTEMS, METHODS, AND STRUCTURES FOR BROADBAND PHASE SHIFTING FOR QUANTITATIVE PHASE MICROSCOPY

CROSS REFERENCE

This application claims the benefit of U.S. Provisional Patent Application Ser. No. 62/933,665 filed 11 Nov. 2019 and U.S. Provisional Patent Application Ser. No. 62/861,514 filed 14 Jun. 2019, the entire contents of each incorporated by reference.

STATEMENT OF GOVERNMENT INTEREST

This invention was made with Government support under Grant No. FA8702-15-0001 awarded by the U.S. Air Force. The Government has certain rights in the invention.

TECHNICAL FIELD

This disclosure relates generally to quantitative phase contrast imaging. More particularly, it pertains to systems, methods, and structures for broadband phase shifting for quantitative phase imaging (QPI).

BACKGROUND

Quantitative phase imaging—or quantitative phase microscopy (QPM)—are collective names for a group of methods that quantify a phase shift that occurs when light passes through a more optically dense object. As will be readily appreciated by those skilled in the art, in a typical— prior art—implementation of QPI, there exists an annular illumination mask placed at a front focus of a condenser optic. This illumination mask—used in conjunction with a condenser lens—creates a dark-field illumination condition with collimated beams converging on a sample positioned in an object plane. Light scattered by the sample at the object plane then propagates along a central axis of an optical system. Unfortunately, a broadband reflective objective has an obscuration along the central axis resulting from its design such that the scattered light is precluded from propagating to the image plane.

SUMMARY

The above problem is solved, and an advance is made in the art according to aspects of the present disclosure directed to systems, methods, and structures for spatial light interference microscopy (SLIM) that includes aspects of both QPI and hyperspectral imaging of a broadband nature wherein such systems, methods, and structures employ broadband phase shifting for quantitative phase imaging in which either or both illumination paths and/or scatter paths: 1) propagate through a reflective objective; 2) become quantifiably phase-shifted utilizing broadband mirror surfaces; 3) attenuate the relatively bright illumination paths to improve (maximize) contrast; and 4) recombine at a sensor plane for quantitative analysis.

Systems, methods, and structures according to aspects of the present disclosure may employ an annular checkerboard patterned mask with sub-apertures in the illumination plane. Advantageously, azimuthally-alternating illumination and scatter beamlets propagate through an unobstructed annular aperture of a reflective objective in a dark-field-like configuration.

These collimated beamlets may then be segregated and subsequently phase-shifted and attenuated as necessary through the effect of a beamsplitter which forms signal and reference arms. These arms are kept at an equal-path length such that source coherence length requirements are met.

Operationally, the signal arm is phase-shifted by positioning a broadband mirror in a Twyman-Green-like interferometer configuration. The reference arm is attenuated by an attenuating optic. Both interferometer arms include a checkerboard mask, which operate to mask either the illumination beamlets or the scatter beamlets within each arm prior to recombination at the sensor plane. This recombination is accomplished by rotating the mask a fixed amount such that only the illumination or scatter beamlets are permitted to propagate therethrough.

This SUMMARY is provided to briefly identify some aspect(s) of the present disclosure that are further described below in the DESCRIPTION. This SUMMARY is not intended to identify key or essential features of the present disclosure nor is it intended to limit the scope of any claims.

BRIEF DESCRIPTION OF THE DRAWING

A more complete understanding of the present disclosure may be realized by reference to the accompanying drawing in which.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known arrangements, circuits, structures and techniques have not been shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

By way of some additional background, we begin by noting again that quantitative phase imaging/quantitative phase contrast microscopy are collective names for a group of methods that advantageously quantify the phase shift that occurs when light passes through a more optically dense object.

Figure 1:
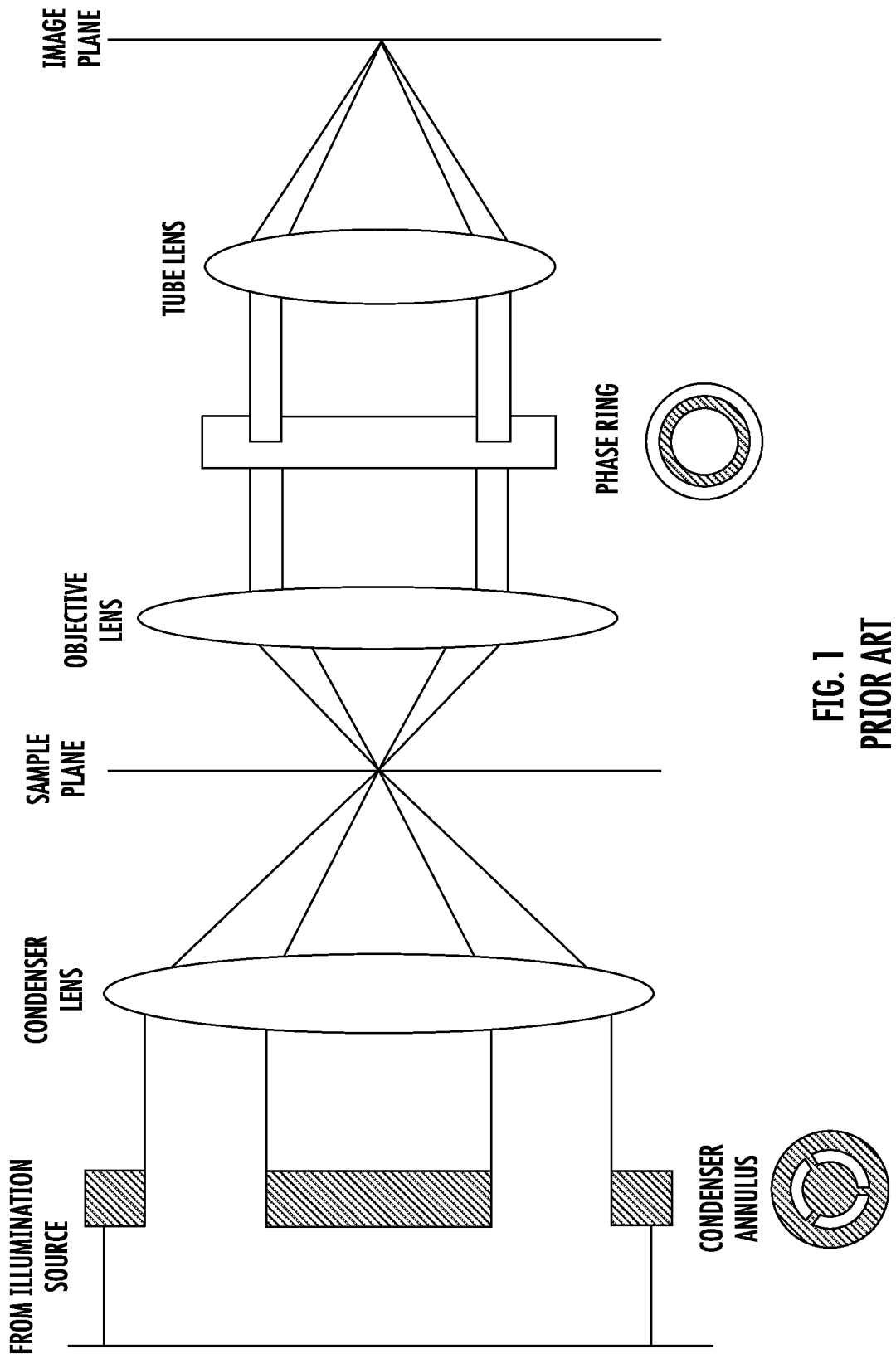
FIG. 1 shows a schematic diagram depicting an illustrative prior-art arrangement for phase imaging.

With reference now to FIG. 1, there is shown a schematic diagram depicting an illustrative arrangement for phase imaging. As may be observed from that figure, illuminating light from an illumination source passes through a condenser annulus and focused on a sample plane—where may be positioned a specimen/sample (not specifically shown). Some of the illuminating light may be scattered by the specimen, while the remaining light is unaffected by the specimen and forms background light. Such light(s) are then directed by an objective lens through a phase ring arrangement and subsequently focused by a tube lens to an image plane.

Generally, and as will be appreciated by those skilled in the art, when observing an unstained biological sample—for example—the scattered light is weak and typically phase shifted. This leads to foreground and background having nearly the same intensity resulting in low image contrast.

In a phase-contrast microscope employing a phase imaging arrangement such as that shown in the figure, image contrast may be increased in two ways: by generating constructive interference between scattered and background light in regions of the field of view that contain the sample, and by reducing the amount of background light that reaches an image plane. In such arrangements, the background light is phase-shifted by passing it through a phase-shifter which eliminates the phase difference between the background and the scattered light.

When the light is then focused on the image plane—where an imager/camera/eyepiece is located—this phase shift results in background and scattered light originating from regions of a field of view that contain the sample (i.e., the foreground) to constructively interfere, resulting in an increase in the brightness of these areas as compared to regions that do not contain the sample. The background is also dimmed by a filter ring which maximizes the amount of scattered light generated by illumination, while minimizing the amount of illumination light that reaches the image plane.

As may be appreciated, such phase-contrast methods enhance contrast optically—blending brightness and phase in a single image. Since the development of digital imagers/cameras, digital phase-imaging methods have been developed collectively known as quantitative phase contrast imaging/microscopy. These methods digitally create two separate images—an ordinary bright field image and a phase-shift image. In each image, the phase-shift image displays the quantified phase shift induced by the sample—which is proportional to the optical thickness of the object.

Figure 2:
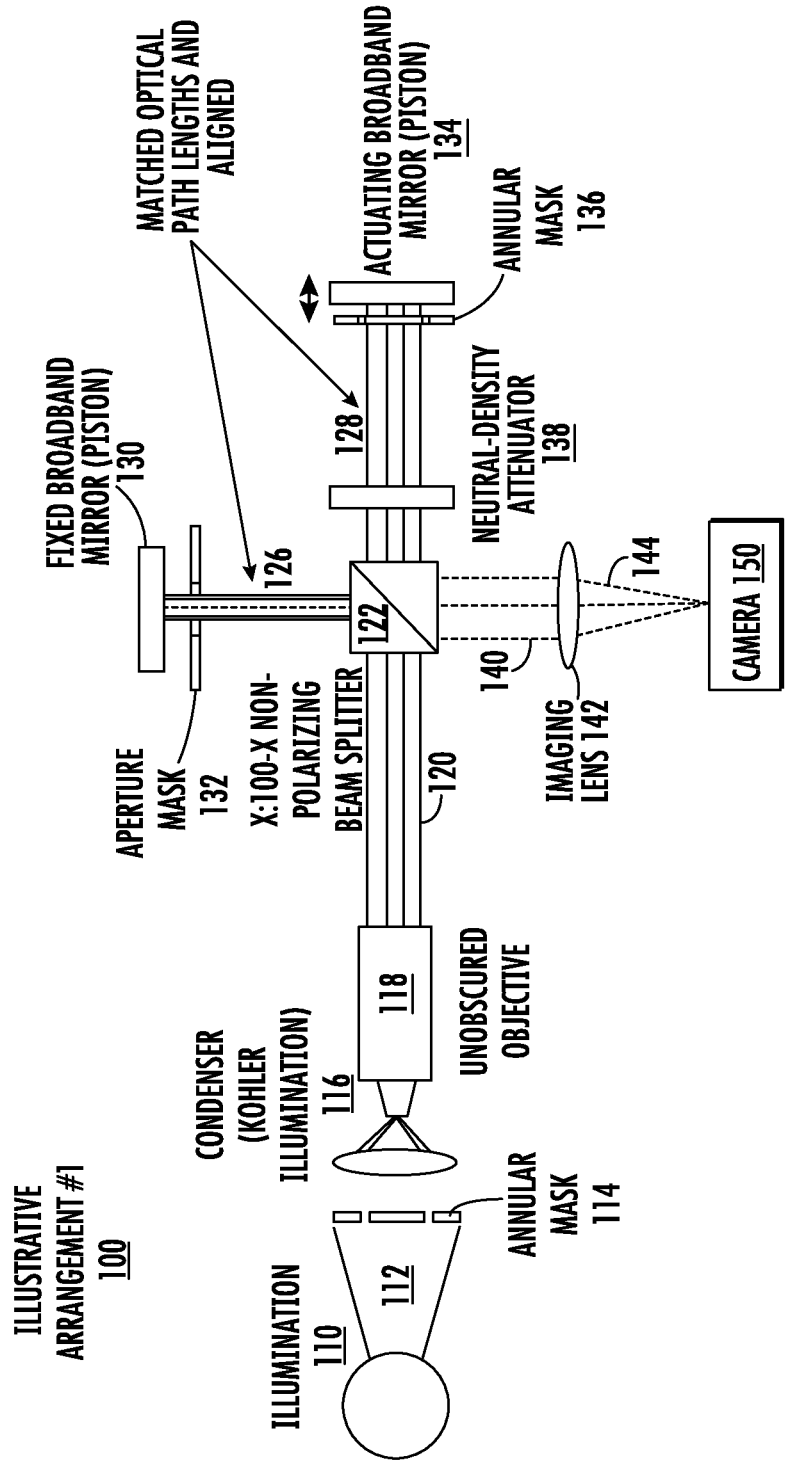
FIG. 2 shows a schematic diagram depicting a first illustrative arrangement providing broadband phase shifting for quantitative phase imaging according to aspects of the present disclosure.

Turning now to FIG. 2, there is shown a schematic diagram depicting a first illustrative arrangement 100 providing broadband phase shifting for quantitative phase imaging according to aspects of the present disclosure. The arrangement includes an illumination source 110, i.e., light source, for illuminating a sample (not specifically shown, positioned prior to an objective 118) with a beam of light 112 after that beam is passed through an annular mask 114 and subsequently directed to the objective through the effect of a condenser 116. As will be known and appreciated by those skilled in the art, the annular mask 114 is configured to block a portion of light emitted from the source and to transmit at least of portion of light emitted from the source. The condenser, illustratively shown as Kohler illumination—is a known technique for providing an even illumination to a sample in microscopy fields.

Operationally, the condensed light interacts with the sample—which may be translucent or transparent—resulting in light that is diffracted by the sample and light that is not diffracted by the sample. The diffracted and non-diffracted light is collected by objective 118 as collected beam 120 and directed to a beam splitter 122 by which it is split and directed into two (i.e the, a first, and a second) matched, separate, aligned, optical paths 126, 128. Accordingly, the collected beam 120 is substantially split into a first light beam and a second light beam and directed into a respective one of the first and second optical paths 126, 128 through the effect of the splitter 122.

Shown forming an end of the first path is a fixed broadband mirror 130 and positioned in this first optical path 126 between the broadband mirror 130 and the splitter 122 is an aperture mask 132.

Shown forming an end of the second optical path 128 is an actuating broadband mirror 134 that may be moved along that path. Positioned between the actuating broadband mirror 134 and the splitter 122 is an annular mask 136 and a neutral density attenuator 138 that attenuates light reflected from the actuating broadband mirror 134 and subsequently passes through the annular mask 136. As will be readily appreciated by those skilled in the art, the actuating, movable broadband mirror 134 is configured to be positioned to produce each of a plurality of selected phase shifts in the second light beam relative to the first light beam. The amount that the actuating broadband mirror 134 must be moved to produce desired phase shifts depends on the main wavelength of light illuminating the sample.

Finally, and as will be readily apparent by those skilled in the art, light that is initially split through the effect of the splitter 122 into the two optical paths 126, 128 is reflected back to the splitter 122 through the effect of a respective mirror where the light beam 144 is then is desirably directed to a camera 150 or other imager positioned at an imaging plane (not specifically shown) through the effect of an imaging lens 142 or other structure(s).

As will be appreciated by those skilled in the art, the schematic arrangement shown in the figure bears a resemblance to the well-known Michaelson interferometer, and its derivative Twyman-Green interferometer. As used in QPI according to the present disclosure, the Twyman-Green style interferometer with masks replaces phase modulators typically found in such applications. Of particular advantage, such an arrangement does not require the pistoning mirror with fixed annulus at matched plane for coherent mixing. In addition, the images aligned without masks in place and the masks are inserted and aligned to the objective mask after the mirrors are aligned. Finally, and as will be readily appreciated by those skilled in the art, the arrangement shown is not limited to mirror phase shifting.

Figure 3:
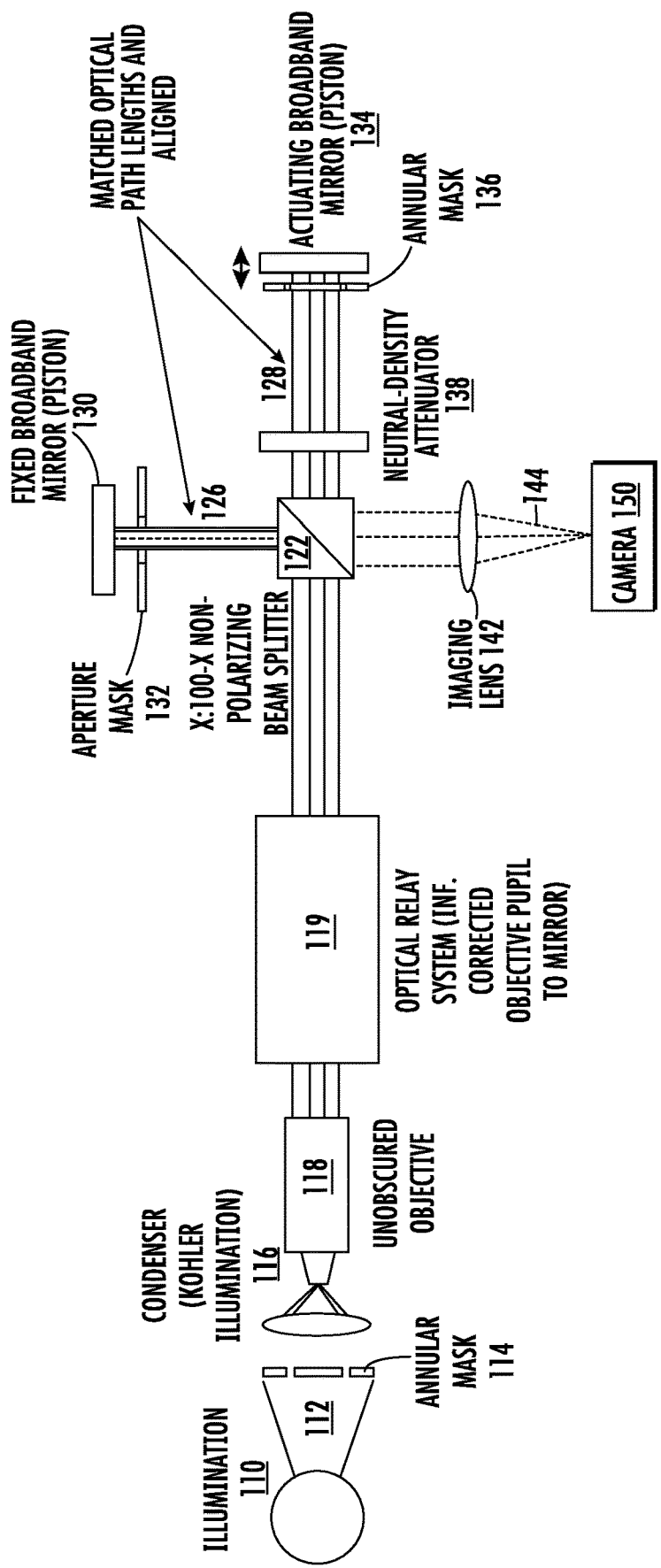
FIG. 3 shows a schematic diagram depicting a second illustrative arrangement providing broadband phase shifting for quantitative phase imaging according to aspects of the present disclosure.

FIG. 3 shows a schematic diagram depicting a second illustrative arrangement providing broadband phase shifting for quantitative phase imaging according to aspects of the present disclosure. With reference to that figure, it may be observed that in this second illustrative configuration, an Optical Relay System 119 is shown interposed between the objective 118 and the beam splitter 122. Those skilled in the art will know and appreciate that such Optical Relay System 119 is a structure/assembly that extends an "optical tube" or overall length of an optical system and/or inverts an image. When so configured, this arrangement—while including those features disclosed previously with respect to FIG. 2—also improves contrast by eliminating field "spread" onto the mirrors and permits well-defined masks.

Figure 4:
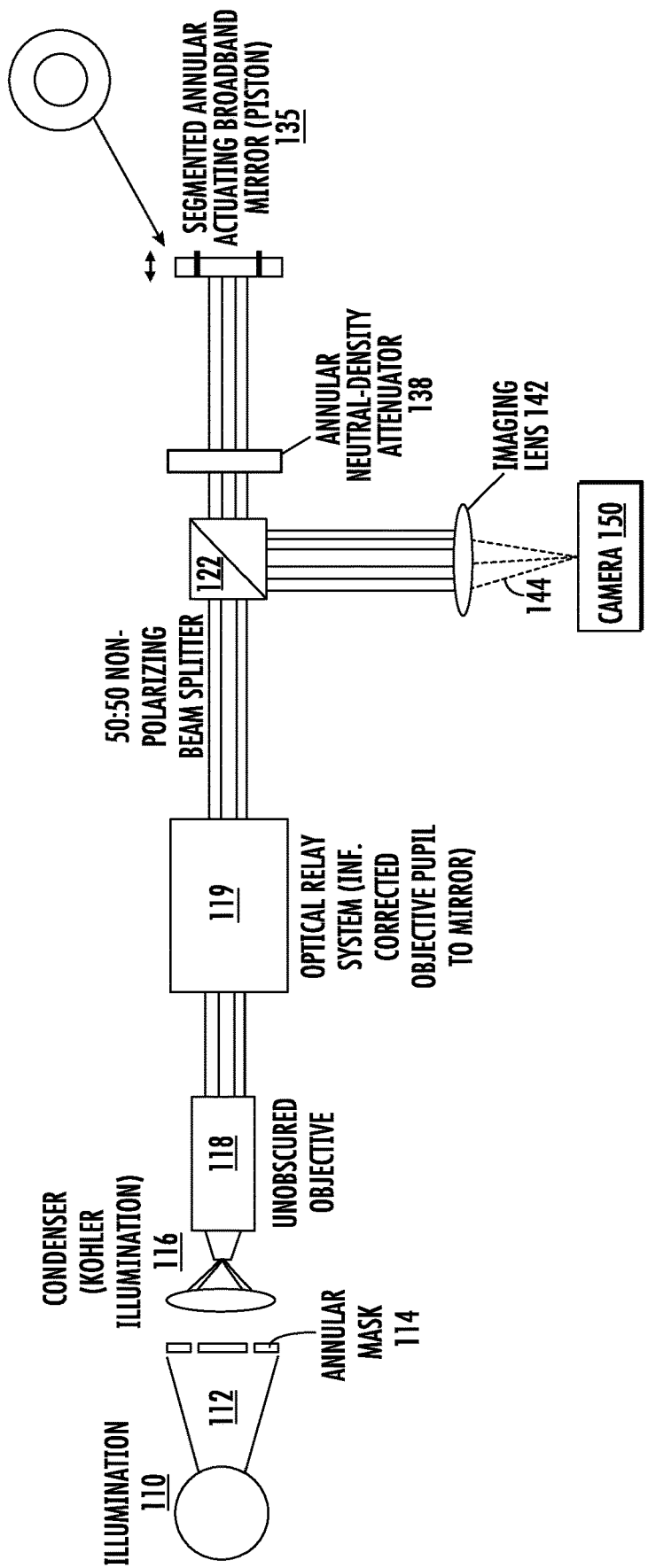
FIG. 4 shows a schematic diagram depicting a third illustrative arrangement providing broadband phase shifting for quantitative phase imaging according to aspects of the present disclosure.

FIG. 4 shows a schematic diagram depicting a third illustrative arrangement providing broadband phase shifting for quantitative phase imaging according to aspects of the present disclosure. With reference to that figure, it may be observed that in this third illustrative configuration the Optical Relay System 119 is again shown interposed between the objective 118 and the beam splitter 122. Additionally, the second optical path is shown including an annular, neutral-density attenuator 138 interposed between the beam splitter 122 and a segmented annular actuating broadband mirror 135.

Figure 5:
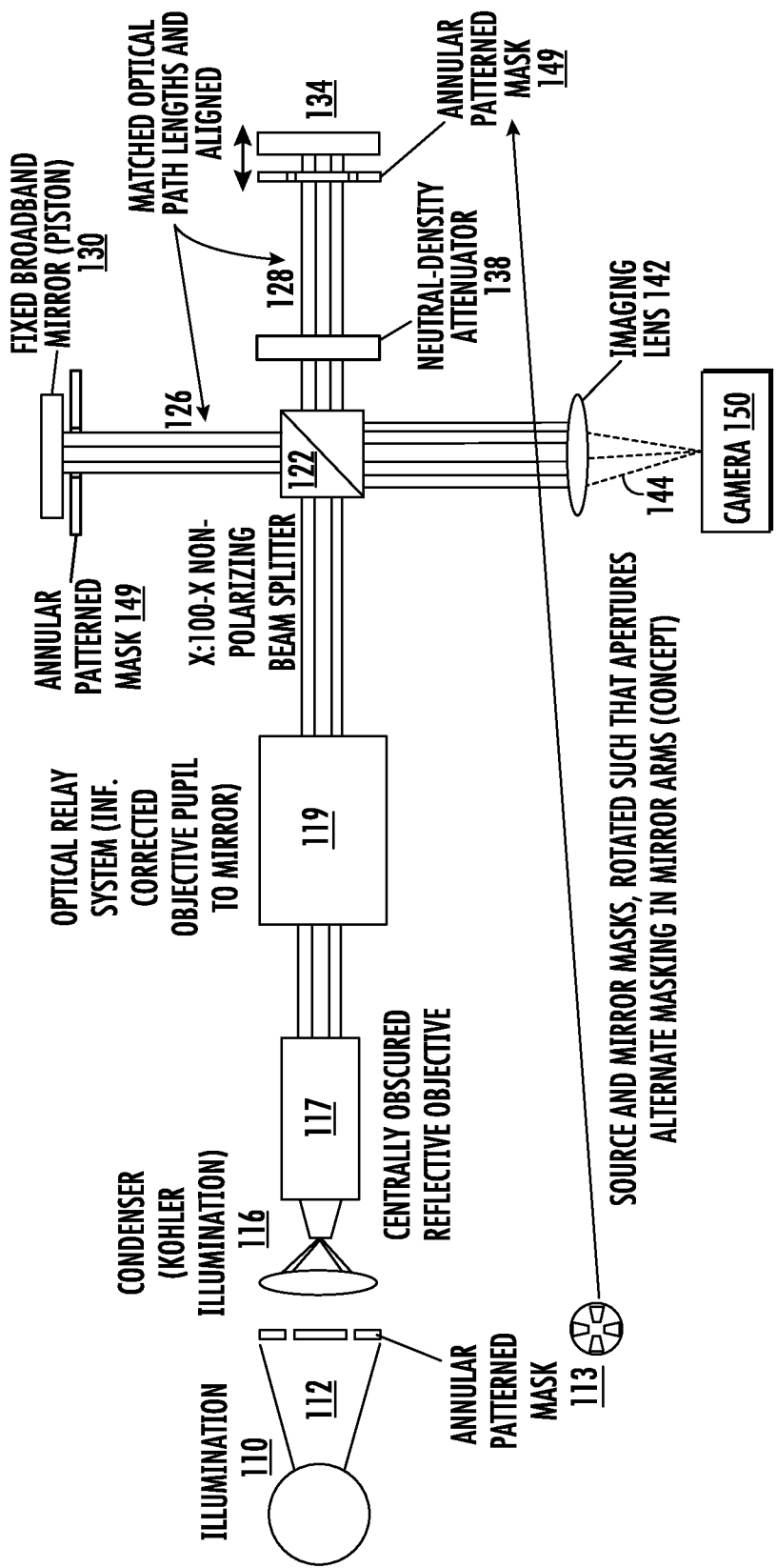
FIG. 5 shows a schematic diagram depicting a fourth illustrative arrangement providing broadband phase shifting for quantitative phase imaging according to aspects of the present disclosure.

Turning now to FIG. 5, there is shown a schematic diagram depicting a fourth illustrative arrangement providing broadband phase shifting for quantitative phase imaging according to aspects of the present disclosure. In this arrangement shown, the structure illustratively shown in FIG. 3 supplemented by a centrally obscured reflective objective 117 and the source annular patterned mask 113 and the mirror annular patterned mask 149 are both rotated during operation such that apertures in the masks alternate masking in the two optical paths 126, 128. As those skilled in the art will readily appreciate, the structure illustrated employs a broadband reflective objective.

Figure 6:
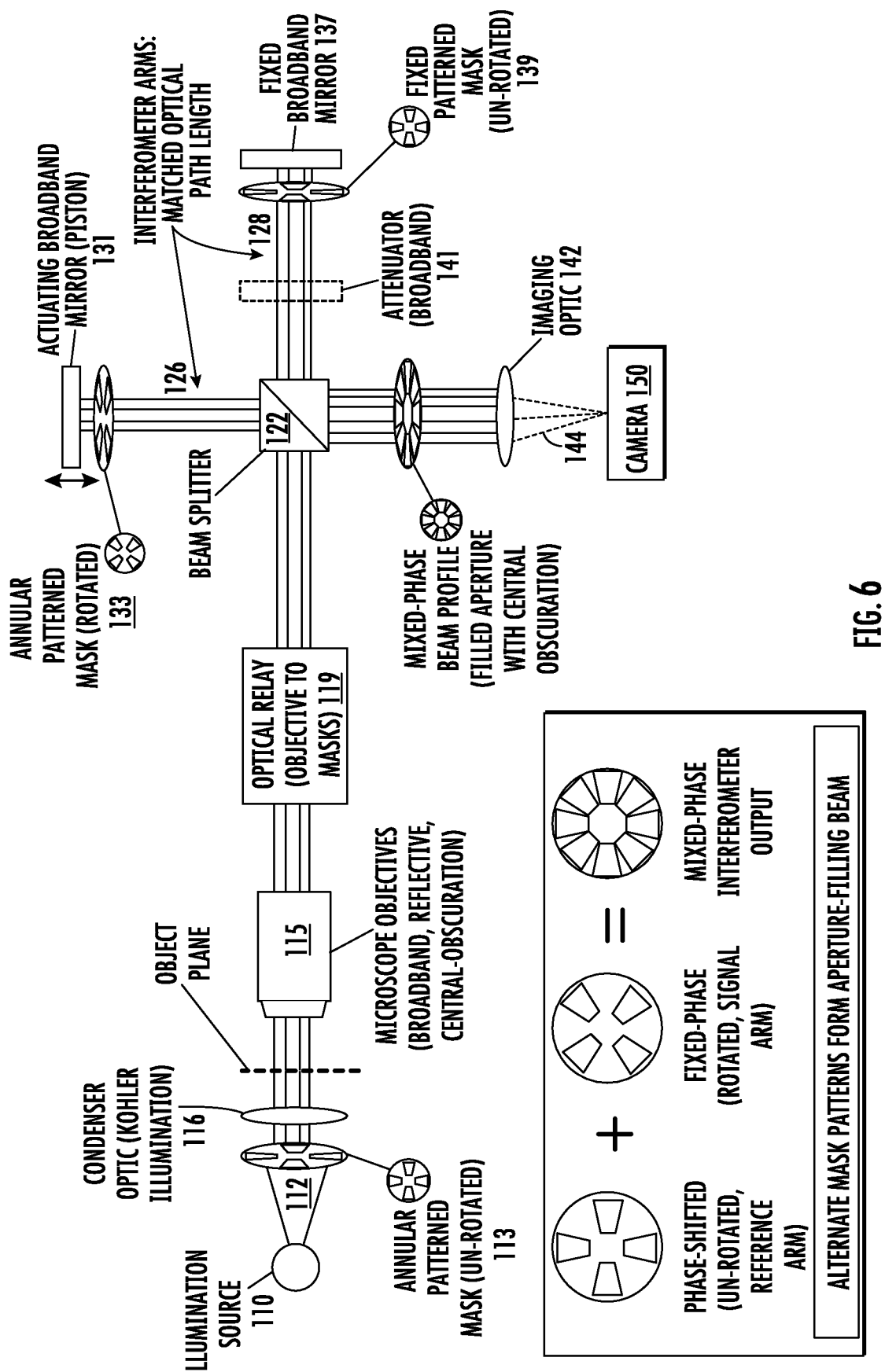
FIG. 6 shows a schematic diagram depicting an illustrative arrangement for quantitative phase imaging according to aspects of the present disclosure.

FIG. 6 is a schematic diagram illustrating a QPI arrangement according to aspects of the present disclosure. In this illustrative arrangement, a microscope objective 115 exhibiting broadband, reflective, central-obscuration characteristics is shown positioned between the object plane and the optical relay 119 as described previously. Additionally, through the use of a rotating annular patterned mask 133 positioned in the first optical path 126 after the splitter 122 and a fixed patterned mask 139 and broadband attenuator 141 positioned in the second optical path 128 after the splitter 122, these alternating mask patterns effectively form an aperture-filling beam. In this embodiment, an actuating broadband mirror 131 is positioned in the first optical path and affixed broadband mirror 137 is positioned in the second optical path.

Figure 7:
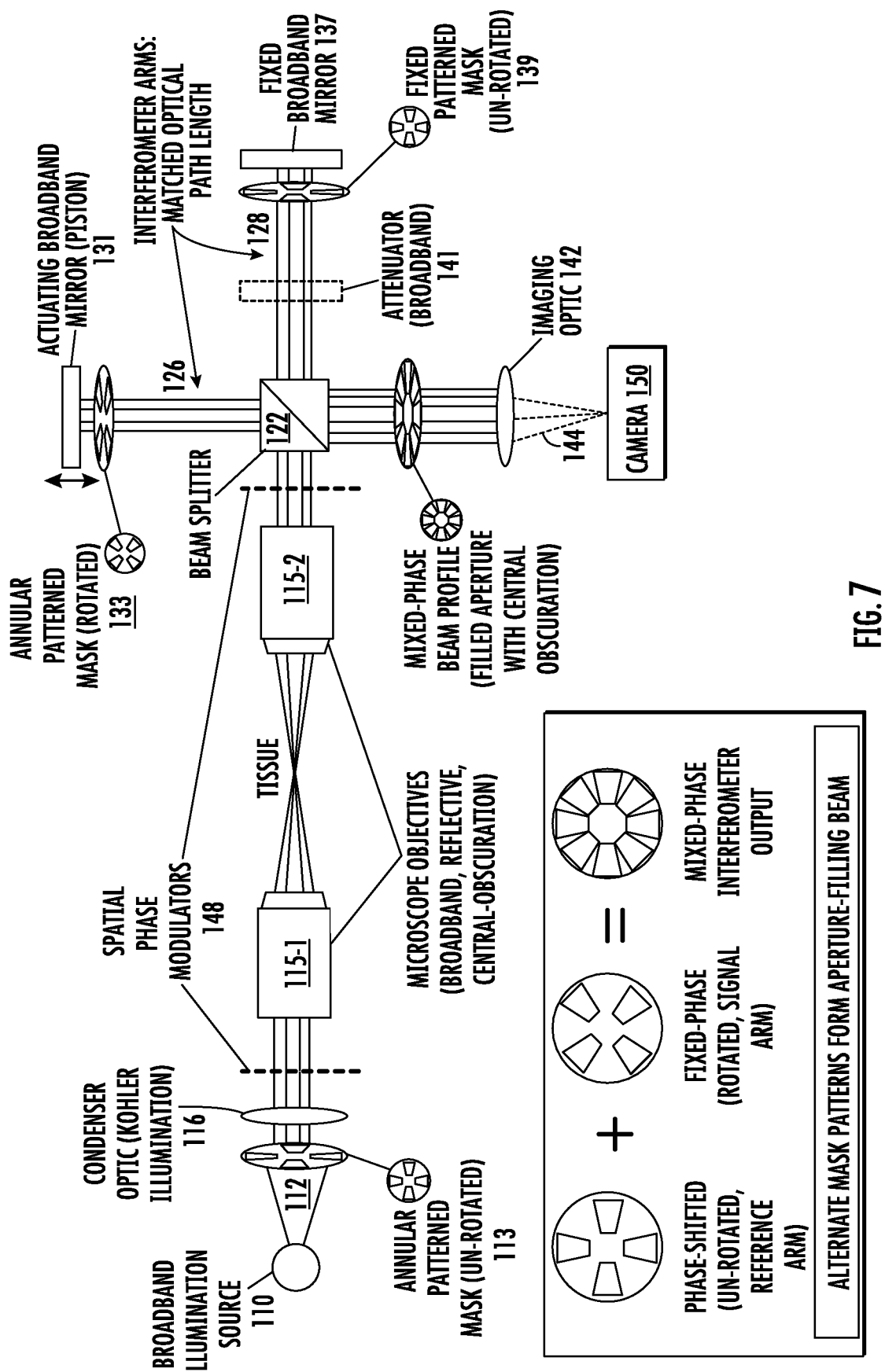
FIG. 7 shows a schematic diagram depicting an alternative illustrative arrangement for quantitative phase imaging that may be employed in deep tissue imaging applications according to aspects of the present disclosure.

Finally, FIG. 7 is a schematic diagram illustrating a QPI arrangement according to aspects of the present disclosure arranged for deep tissue imaging. As may be observed from that figure there are configured a pair of spatial phase modulators 148 positioned in an optical path between the condenser optic 116 and the beam splitter 122. Positioned between the modulators 148 are a pair of microscope objectives 115-1, 115-2, that exhibit broadband, reflective, central-obscuration characteristics such as those described previously. The objectives are arranged in the optical path such that a tissue or other sample is positioned between the objectives 115-1, 115-2 and a phase image is produced at the image plane of a camera 150. Those skilled in the art will quickly understand and appreciate that the use of broadband light as shown provides excellent depth resolution. More particularly, the longer wavelengths scatter less (than shorter wavelengths) and penetrate tissue to greater depths. Additionally, broadband quantitative phase imaging as shown and described advantageously provides dynamic contrast at the imaged object plane for spatial phase modulator optimization targets (merit functions). As such, an algorithm may be employed to vary spatial phase to maximize contrast for each imager pixel. Furthermore, it may be possible to operate structures according to the present disclosure in either a monostatic or bistatic configuration. Finally, and as will surely be appreciated by those skilled in the art, the tissue being imaged may be move in any of x, y, or z to generate an imaged volume of that tissue.

Figure 8:
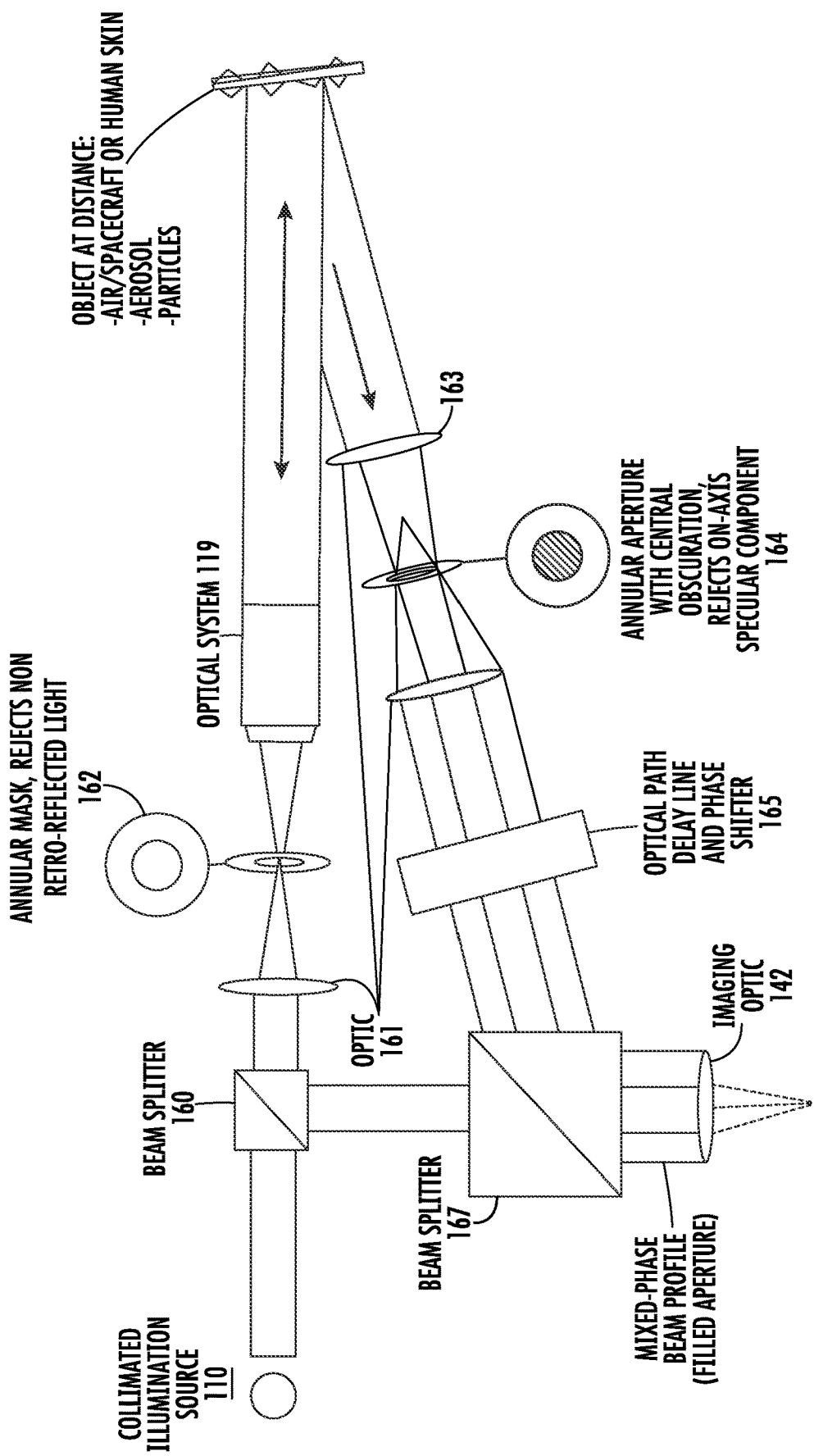
FIG. 8 shows a schematic diagram depicting an alternative illustrative arrangement for quantitative phase imaging that may be employed—for example—with objects at distance such as spacecraft, skin, aerosol, particles, etc., applications according to aspects of the present disclosure.

FIG. 8 shows a schematic diagram depicting an alternative illustrative arrangement for quantitative phase imaging that may be employed—for example—with objects at distance such as spacecraft, skin, aerosol, particles, etc., according to aspects of the present disclosure. With reference to that figure, it may be observed that a collimated illumination source 110 such as those previously described or known emits an illuminating light beam that is directed to a beam splitter 160 wherein at least a portion of the illuminating light beam is directed through the beam splitter 160, an optical element (lens) 161, an annular mask 162—which rejects non-retro-reflected light, and finally to an optical system/relay 119 and onto/at an object located at a distance. As indicated, such object may be at substantial distance from the illumination source such as a spacecraft, human skin, air including aerosol(s) and/or particles, etc.

Similar to the processes described previously, a portion of light that strikes the object will be reflected/scattered back through the optical system 119, annular mask 162, optic 161, beam splitter 160 etc, while another portion will be reflected/scattered back along another path including additional optics (lens) 163, an annular aperture 164 including central obscuration, and an optical delay structure 165. The reflected/scattered light from each path will be directed to a common beam splitter 167 in which a mixed-phase beam profile (filled aperture) results from the reflected/scattered light. The mixed-phase beam is directed to an imaging optic 142 and subsequently to a camera/imager 150 from which an image may be obtained.

At this point, those skilled in the art will readily appreciate that while the methods, techniques, and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. A system for quantitative phase imaging comprising:
a light source for illuminating a sample with a beam of light;
an imager for producing an image of the sample; and
an arrangement of optical elements configured to provide a first optical path, referred to as a scatter path and a second optical path, referred to as an illumination path for light diffracted by the sample and light not diffracted by the sample, respectively, the arrangement defining an optical path between the sample and the imager, the arrangement including:
a beamsplitter configured to split/direct the diffracted light and not diffracted light into the scatter path and illumination path, respectively, and subsequently direct light traversing those paths to the imager;
an actuating broadband mirror positioned in the illumination path, wherein a position of the broadband mirror enables the broadband mirror to phase shift light traversing the illumination path;
an annular, checkerboard patterned mask having sub-apertures, the annular, checkerboard patterned mask positioned between the light source and the sample; and
another annular, checkerboard patterned mask having sub-apertures positioned between the broadband mirror and the beamsplitter, both patterned masks rotated such that sub-apertures alternately masking in both the scatter path and the illumination path; and
an attenuator positioned in the illumination path.

2. The system of claim 1 wherein the arrangement of optical elements includes an imaging lens positioned in an optical path between the beamsplitter and the imager, the imaging lens configured to direct light to a focal plane of the imager.

3. The system of claim 1, further comprising a fixed broadband mirror positioned in the scatter path.

4. The system of claim 3 wherein the another annular, checkerboard patterned mask positioned in the illumination path is positioned between the attenuator and the actuating broadband mirror.

5. The system of claim 4 further comprising an aperture mask positioned in the scatter path between the fixed broadband mirror and the beamsplitter.

6. The system of claim 5 wherein the aperture mask exhibits a checkerboard pattern.

7. The system of claim 6 wherein the aperture mask and the annular, checkerboard patterned mask are each configured such that they only allow propagation of scatter beamlets or illumination beamlets.

8. A quantitative phase imaging method comprising:
illuminating a sample with an illumination light such that scattered and non-scattered light is produced;
directing the illumination light through a patterned mask prior to illumination of the sample;
directing both the scattered and non-scattered light through a reflective objective;
splitting the scattered and non-scattered light and directing same into a first optical path, referred to as a scatter path and a second optical path, referred to as an illumination path, respectively;
phase shifting light traversing at least one of the paths through positioning of a broadband mirror;
attenuating light traversing the illumination path;
masking the scattered and non-scattered light through use of a set of masks, one positioned in each of the scatter path and illumination path by rotating the masks by a fixed amount such that only the non-scattered light is allowed to propagate along a portion of the illumination path and only scattered light is allowed to propagate along a portion of the scatter path; and
recombining, at a sensor plane, the scattered and non-scattered light after respectively traversing the scatter path and illumination path.

9. The method of claim 8 further comprising:
maintaining an equal path-length for both the scatter and illumination paths.

10. The method of claim 9 further comprising:
operating a movable piston attached to the broadband mirror to change an optical path length.

11. The method of claim 8 further comprising:
phase shifting light traversing the other one of the paths through positioning of a broadband mirror.

12. The method of claim 8 further comprising:
relaying, prior to the splitting, the scattered and non-scattered light through use of an optical relay.

* * * * *